(12) United States Patent
Takei et al.

(10) Patent No.: US 12,045,775 B2
(45) Date of Patent: Jul. 23, 2024

(54) PART MANAGEMENT APPARATUS, PART MANAGEMENT SYSTEM, PART MANAGEMENT METHOD, AND COMPUTER READABLE RECORDING MEDIUM

(71) Applicant: HONDA MOTOR CO., LTD., Tokyo (JP)

(72) Inventors: Yasuhito Takei, Saitama (JP); Atsushi Fujikawa, Saitama (JP); Tsutomu Kamiyamaguchi, Saitama (JP); Fumihiro Yoshino, Saitama (JP); Hiroshi Kimura, Saitama (JP); Ryosuke Itoyama, Saitama (JP); Ryuzo Sakamoto, Saitama (JP); Atsushi Kubota, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 248 days.

(21) Appl. No.: 17/676,835

(22) Filed: Feb. 22, 2022

(65) Prior Publication Data
US 2022/0300900 A1      Sep. 22, 2022

(30) Foreign Application Priority Data
Mar. 22, 2021    (JP) ................................ 2021-047853

(51) Int. Cl.
*G06Q 10/0875*     (2023.01)
*G07C 5/08*        (2006.01)

(52) U.S. Cl.
CPC ....... *G06Q 10/0875* (2013.01); *G07C 5/0808* (2013.01)

(58) Field of Classification Search
CPC .......................... G06Q 10/0875; G07C 5/0808
See application file for complete search history.

(56) References Cited

U.S. PATENT DOCUMENTS

| | | | |
|---|---|---|---|
| 8,224,520 B2 * | 7/2012 | Ito ........................ | G07C 5/0816 702/182 |
| 2015/0134400 A1 | 5/2015 | Kashi | |
| 2020/0023858 A1 * | 1/2020 | Zeh ........................ | B60T 8/885 |

FOREIGN PATENT DOCUMENTS

| | | |
|---|---|---|
| JP | H07175511 A | 7/1995 |
| JP | 2003132168 A | 5/2003 |

(Continued)

OTHER PUBLICATIONS

Office Action issued for counterpart Japanese Application No. 2021-047853, issued by the Japanese Patent Office on Jan. 24, 2023 (drafted on Jan. 18, 2023).

*Primary Examiner* — Paul Danneman

(57) ABSTRACT

A part management apparatus may include an acquisition unit configured to acquire part information indicating a part having a symptom of a failure among a plurality of parts configuring a drive mechanism mounted to a vehicle. The part management apparatus may include an identification unit configured to refer to a storage unit that is configured to store a material configuring each of the plurality of parts to identify a material of the part indicated by the part information. The part management apparatus may include a notification unit configured to notify a material management apparatus configured to manage an inventory of a material of a part, of information related to the material of the part.

14 Claims, 11 Drawing Sheets

(56) References Cited

FOREIGN PATENT DOCUMENTS

JP 2004110568 A 4/2004
WO 2013186874 A1 12/2013

* cited by examiner

| TIME (sec) | R(rpm) | V(km/h) | T(°C) |
|---|---|---|---|
| 0.0 | 1,461 | 32 | 78 |
| 0.2 | 1,437 | 37 | 78 |
| 0.4 | 1,383 | 36 | 78 |
| 0.6 | 1,353 | 33 | 79 |
| ... | ... | ... | ... |
| ... | ... | ... | ... |
| ... | ... | ... | ... |
| ... | ... | ... | ... |
| ... | ... | ... | ... |
| ... | ... | ... | ... |
| ... | ... | ... | ... |
| ... | ... | ... | ... |
| ... | ... | ... | ... |
| ... | ... | ... | ... |

FIG.3

| TIME (sec) | R(rpm) | | | | V(km/h) | | | | T(°C) | | | |
|---|---|---|---|---|---|---|---|---|---|---|---|---|
| | $R_{av}$ | $R_{mx}$ | $R_{mn}$ | $R_{in}$ | $V_{av}$ | $V_{mx}$ | $V_{mn}$ | $V_{in}$ | $T_{av}$ | $T_{mx}$ | $T_{mn}$ | $T_{in}$ |
| 0 SECONDS TO 3 SECONDS | $R_{av-1}$ | $R_{mx-1}$ | $R_{mn-1}$ | $R_{in-1}$ | $V_{av-1}$ | $V_{mx-1}$ | $V_{mn-1}$ | $V_{in-1}$ | $T_{av-1}$ | $T_{mx-1}$ | $T_{mn-1}$ | $T_{in-1}$ |
| 3 SECONDS TO 6 SECONDS | $R_{av-2}$ | $R_{mx-2}$ | $R_{mn-2}$ | $R_{in-2}$ | $V_{av-2}$ | $V_{mx-2}$ | $V_{mn-2}$ | $V_{in-2}$ | $T_{av-2}$ | $T_{mx-2}$ | $T_{mn-2}$ | $T_{in-2}$ |
| 6 SECONDS TO 9 SECONDS | $R_{av-3}$ | $R_{mx-3}$ | $R_{mn-3}$ | $R_{in-3}$ | $V_{av-3}$ | $V_{mx-3}$ | $V_{mn-3}$ | $V_{in-3}$ | $T_{av-3}$ | $T_{mx-3}$ | $T_{mn-3}$ | $T_{in-3}$ |
| 9 SECONDS TO 12 SECONDS | $R_{av-4}$ | $R_{mx-4}$ | $R_{mn-4}$ | $R_{in-4}$ | $V_{av-4}$ | $V_{mx-4}$ | $V_{mn-4}$ | $V_{in-4}$ | $T_{av-4}$ | $T_{mx-4}$ | $T_{mn-4}$ | $T_{in-4}$ |
| 12 SECONDS TO 15 SECONDS | $R_{av-5}$ | $R_{mx-5}$ | $R_{mn-5}$ | $R_{in-5}$ | $V_{av-5}$ | $V_{mx-5}$ | $V_{mn-5}$ | $V_{in-5}$ | $T_{av-5}$ | $T_{mx-5}$ | $T_{mn-5}$ | $T_{in-5}$ |
| ... | ... | ... | ... | ... | ... | ... | ... | ... | ... | ... | ... | ... |

*FIG. 4*

| PART | MATERIAL | WEIGHT (kg) |
|---|---|---|
| GEAR A | SCr420 | 0.5 |
| GEAR B | SCr420 | 1.2 |
| GEAR C | SNCM | 2.5 |
| BEARING A | SUJ2 | 0.3 |
| WINDING WIRE | C1020 | 10.5 |
| ... | ... | ... |

FIG.8

| PART | MATERIAL | WEIGHT (kg/EACH) | THE NUMBER OF ORDER-RECEIVED PARTS | THE NUMBER OF RECOVERED PARTS | TOTAL WEIGHT OF ORDER-PLACED MATERIAL (kg) |
|---|---|---|---|---|---|
| GEAR A | SCr420 | 0.5 | 1000 | 300 | 350 |
| GEAR B | SCr420 | 1.2 | 500 | 300 | 240 |
| GEAR C | SNCM | 2.5 | 1100 | 100 | 2500 |
| BEARING A | SUJ2 | 0.3 | 700 | 200 | 1500 |
| WINDING WIRE | C1020 | 10.5 | 800 | 400 | 4200 |
| ... | ... | ... | ... | ... | ... |

FIG.9

PART MANAGEMENT APPARATUS, PART MANAGEMENT SYSTEM, PART MANAGEMENT METHOD, AND COMPUTER READABLE RECORDING MEDIUM

BACKGROUND

1. Technical Field

The contents of the following Japanese patent application are incorporated herein by reference:

2021-047853 filed in JP on Mar. 22, 2021.

The present invention relates to a part management apparatus, a part management system, a part management method, and a computer readable recording medium.

2. Related Art

Patent document 1 describes a situation in which order placement of a planned order part is performed with a delivery instruction card, and the part is delivered together with this delivery instruction card, so that an actual use amount of the planned order parts is collected by reading the delivery instruction card attached to the part when the part is used, and it is easy to grasp an unplanned use or the like.

PRIOR ART DOCUMENT

Patent Document

[Patent document 1] Japanese Unexamined Patent Application, Publication No. H7-175511

BRIEF DESCRIPTION OF THE DRAWINGS

FIG. 3 illustrates one example of data acquired from a sensor.

FIG. 4 illustrates one example of a numeric vector.

FIG. 8 illustrates one example of information related to a material of a part.

FIG. 9 illustrates one example of information related to a material required to fabricate the part.

DESCRIPTION OF EXEMPLARY EMBODIMENTS

Hereinafter, the present invention will be described by way of embodiments of the invention, but the following embodiments are not intended to restrict the invention according to the claims. In addition, not all combinations of features described in the embodiments necessarily have to be essential to solving means of the invention.

Figure 1:
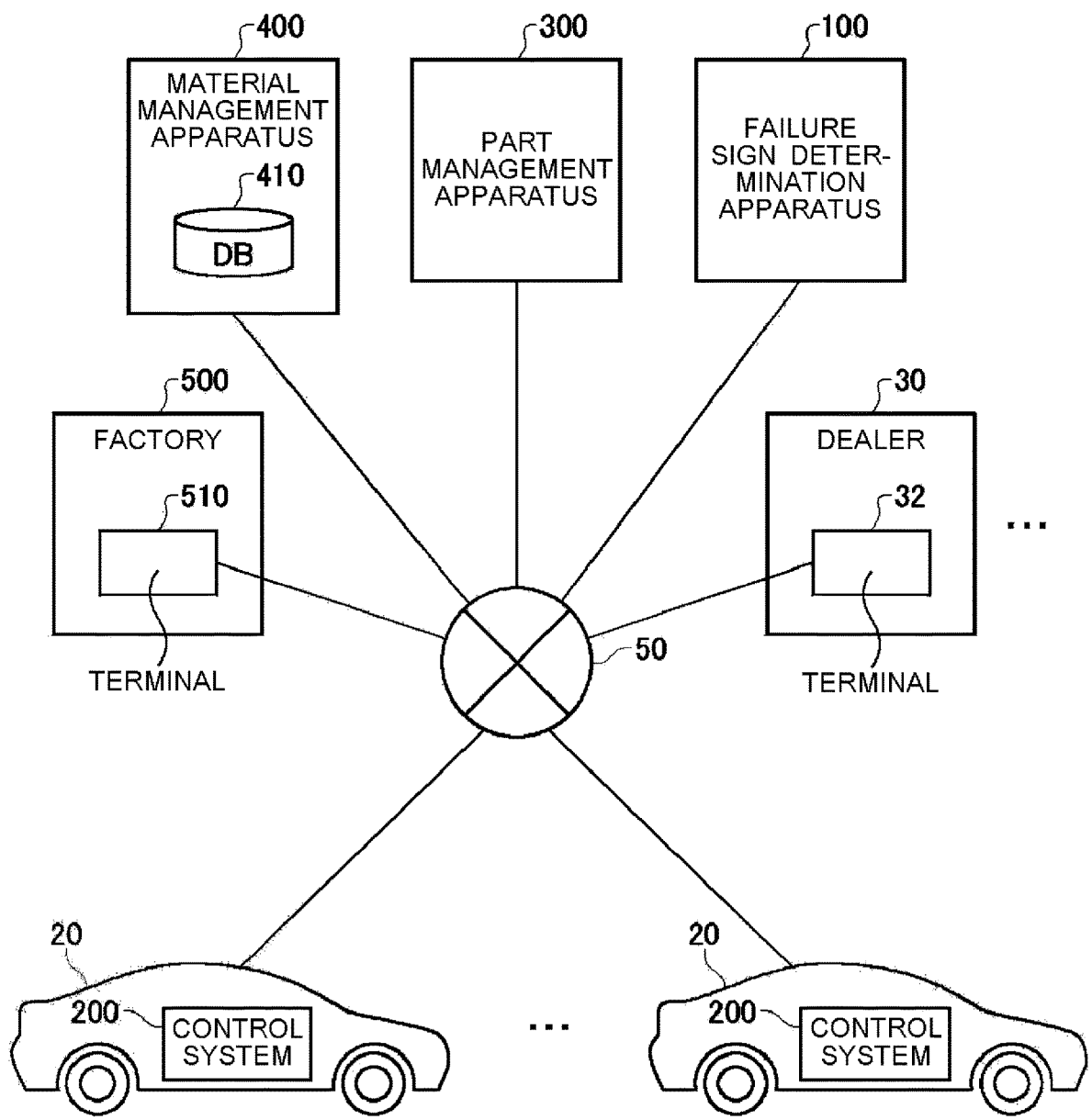
FIG. 1 illustrates one example of an overall configuration of a part management system.

FIG. 1 illustrates one example of an overall configuration of a part management system 10 according to the present embodiment. The part management system 10 includes a plurality of vehicles 20, a terminal 32 arranged in each of a plurality of dealers 30, a failure symptom determination apparatus 100, a part management apparatus 300, a material management apparatus 400, and a terminal 510 arranged in a factory 500.

The vehicle 20, the failure symptom determination apparatus 100, the part management apparatus 300, the material management apparatus 400, and the terminals 32 and 510 may be connected to each other via a network 50 such as the Internet.

The vehicle 20 includes a control system 200 configured to control the vehicle 20. According to the present embodiment, an example will be described while a hybrid vehicle is used as the vehicle 20. The vehicle 20 includes an engine and a motor generator as a drive mechanism. However, the vehicle 20 may be a vehicle of any driving method such as an engine vehicle or an electric motor vehicle. The drive mechanism included in the vehicle 20 may include the engine, the motor generator, an automatic transmission, a decelerator, an electric CVT, and the like.

The failure symptom determination apparatus 100 is configured to collect data indicating a state of the vehicle 20 which is detected by a sensor mounted to the vehicle 20 from a plurality of vehicles 20. The failure symptom determination apparatus 100 determines whether a part having a symptom of a failure is present among a plurality of parts configuring the drive mechanism mounted to the vehicle 20 based on data indicating the state of the vehicle 20 by machine learning using the data indicating the state of the vehicle which is detected by the sensor mounted to the vehicle 20 as training data by a time when a failure of any part among the plurality of parts occurs. When the part having the symptom of the failure is present, the failure symptom determination apparatus 100 notifies the terminal 32 of the dealer 30 and the part management apparatus 300 of information related to the part having the symptom of the failure.

Inventory management in the dealer 30, order placement of a new vehicle, order placement of a repair part, and the like are performed in the dealer 30 via the terminal 32. The terminal 32 receives the information related to the part having the symptom of the failure. A person in charge in the dealer 30 places an order of a repair part when necessary according to the information related to the part having the symptom of the failure.

The part management apparatus 300 receives the information related to the part having the symptom of the failure. The part management apparatus 300 identifies a material required to fabricate the part based on the information related to the part having the symptom of the failure, and transmits information related to the material of the part to the material management apparatus 400 configured to manage a material of a part.

The material management apparatus 400 may manage an inventory of a material of a part. The material management apparatus 400 predicts a total weight of the material required to fabricate the part based on the information related to the material of the part, and places an order of the material when necessary to the factory 500 where the material is fabricated. The terminal 510 arranged in the factory 500 performs order receipt processing according to the order placement of the material. It should be noted that the failure symptom determination apparatus 100 and the part management apparatus 300 may be configured by a single apparatus. The failure symptom determination apparatus 100, the part management apparatus 300, and the material management apparatus 400 may be configured by a single apparatus. In addition, the part management apparatus 300 and the material management apparatus 400 may be configured by a single apparatus.

In accordance with the part management system 10 according to the present embodiment, when the part having the symptom of the failure is present, it is possible to place an order of the material of the part in advance while the order placement of the part is expected. Thus, a delivery period of the part after the receipt of the order placement of the part and a period of time until part replacement can be shortened.

Figure 2:
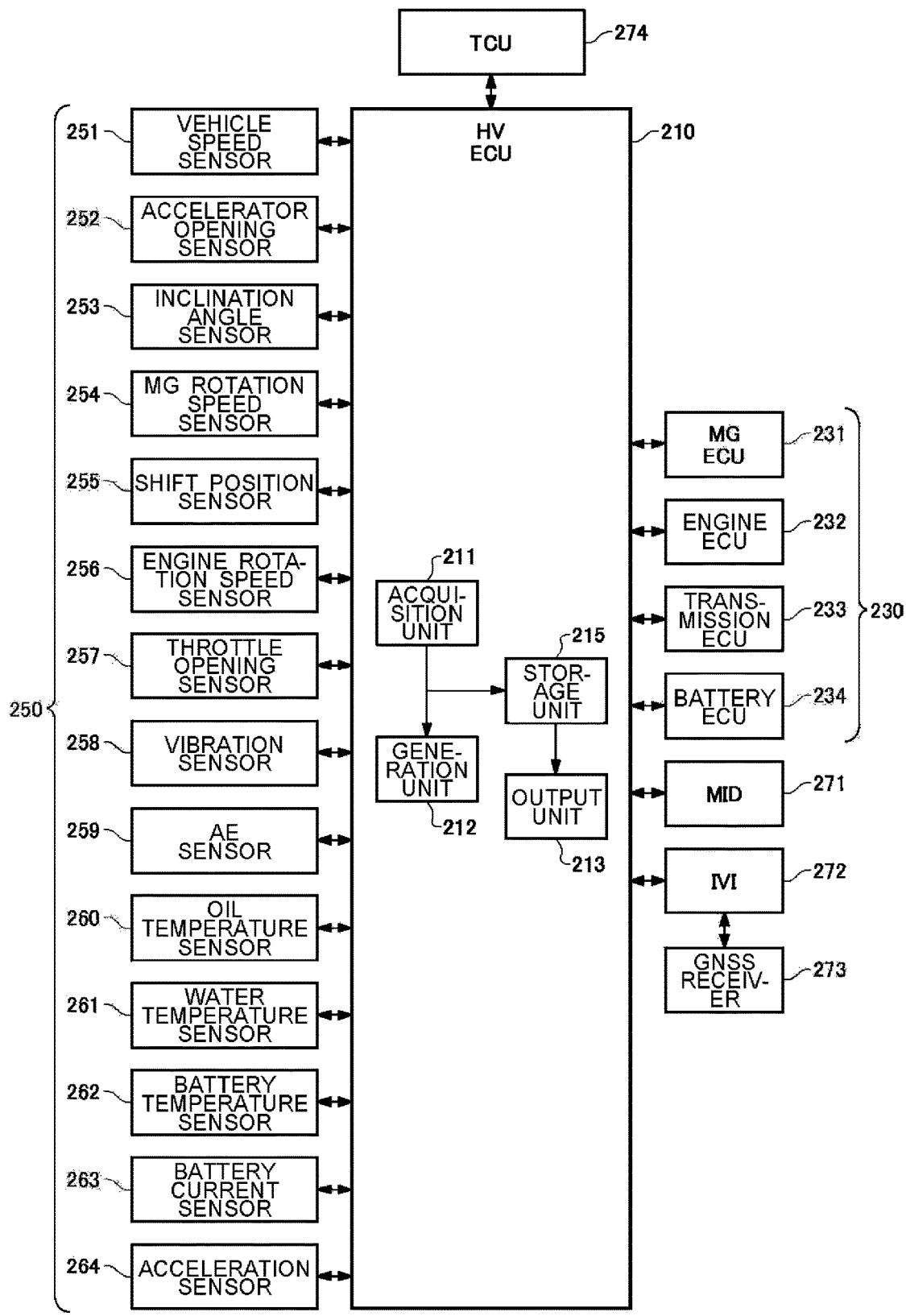
FIG. 2 schematically illustrates a system configuration of a control system included in a vehicle.

FIG. 2 schematically illustrates a system configuration of the control system 200 included in the vehicle 20. The control system 200 includes an HVECU 210, various types of ECUs 230, various types of sensors 250, an MID 271, an IVI 272, a GNSS receiver 273, and a TCU 274.

The HVECU 210 is a hybrid electronic control unit (ECU) configured to control the vehicle 20. The HVECU 210 and the various types of ECUs 230 may be configured by including a so called microcomputer constituted by a CPU, a ROM, a RAM, an input and output interface, and the like. The HVECU 210 performs signal processing according to a program stored in advance in the ROM while a temporary storage function of the RAM is utilized.

The HVECU 210 is connected to the MID 271, the IVI 272, the TCU 274, and each of the ECUs 230 via an in-vehicle communication line. The HVECU 210 communicates with the MID 271, the IVI 272, the TCU 274, and the various types of ECUs 230 via the in-vehicle communication line. The HVECU 210 controls the MID 271, the IVI 272, the TCU 274, and each of the ECUs 230 in an overall manner via the in-vehicle communication line. The in-vehicle communication line may be configured by including, for example, a controller area network (CAN), an Ether network, or the like.

The MID 271 is a multi information display. The IVI 272 is an in-vehicle infotainment information device (IVI). The MID 271 and the IVI 272 are connected to the HVECU 210 via the in-vehicle communication line. The MID 271 and the IVI 272 may function as a display control unit. The IVI 272 includes a wireless LAN communication function. The GNSS receiver 273 identifies a location of the vehicle 20 based on a signal received from a global navigation satellite system (GNSS) satellite.

The IVI 272 acquires location information of the vehicle 20 from the GNSS receiver 273. The IVI 272 outputs the location information acquired from the GNSS receiver 273 to the HVECU 210.

The TCU 274 is a telematics control unit. The TCU 274 is mainly responsible for a mobile communication. The TCU 274 transmits and receives data with an external apparatus based on the control of the HVECU 210.

Each of the ECUs 230 includes an MGECU 231, an engine ECU 232, a transmission ECU 233, and a battery ECU 234. The MGECU 231 controls a driving motor generator mounted to the vehicle 20. The engine ECU 232 controls an engine mounted to the vehicle 20. The transmission ECU 233 controls a transmission mounted to the vehicle 20. The battery ECU 234 controls a battery that is a high voltage battery mounted to the vehicle 20.

The HVECU 210 executes hybrid drive control related to the motor generator via the MGECU 231 and the engine via the engine ECU 232. The HVECU 210 executes shift control of the transmission via the transmission ECU 233. The HVECU 210 executes charge and discharge control of the battery via the battery ECU 234.

The various types of sensors 250 include a vehicle speed sensor 251, an accelerator opening sensor 252, an inclination angle sensor 253, an MG rotation speed sensor 254, a shift position sensor 255, an engine rotation speed sensor 256, a throttle opening sensor 257, a vibration sensor 258, an AE sensor 259, an oil temperature sensor 260, a water temperature sensor 261, a battery temperature sensor 262, a battery current sensor 263, and an acceleration sensor 264. The various types of sensors 250 may include other sensors configured to detect a torque of the engine or the motor generator, a current of the motor generator, a temperature of the motor generator, a hydraulic pressure of engine oil, a temperature of hydraulic oil of an automatic transmission (ATF temperature), a sound, and the like.

The vehicle speed sensor 251 detects a vehicle speed of the vehicle 20. The accelerator opening sensor 252 detects an accelerator opening based on an operation of a driver, that is, an operation amount of an accelerator pedal. The inclination angle sensor 253 detects an inclination of the vehicle 20. The MG rotation speed sensor 254 detects the number of rotations of the motor generator. The shift position sensor 255 detects a shift position of a shift lever. The engine rotation speed sensor 256 detects the number of rotations of the engine. The throttle opening sensor 257 detects an opening of a throttle value of the engine. The battery temperature sensor 262 detects a temperature of the battery. The battery current sensor 263 detects a charge and discharge current of the battery.

The HVECU 210 sets required driving force based on the vehicle speed detected by the vehicle speed sensor 251 and the accelerator opening detected by the accelerator opening sensor 252. The HVECU 210 judges whether the vehicle 20 is at the start of travelling based on the vehicle speed detected by the vehicle speed sensor 251. The HVECU 210 judges whether the vehicle 20 is on an uphill road or a downhill road based on the inclination angle detected by the inclination angle sensor 253. The engine ECU 232 controls an output torque from the engine according to the set required driving force based on an instruction from the HVECU 210. The MGECU 231 controls an output torque from the motor generator according to the set required driving force based on an instruction from the HVECU 210. The transmission ECU 233 performs shift control of the transmission according to the set required driving force.

The battery ECU 234 controls charge and discharge of the battery based on battery information indicating a state of the battery such as an inter-terminal voltage of the battery, the charge and discharge current of the battery from the battery current sensor 263, and the battery temperature from the battery temperature sensor 262. The battery ECU 234 executes an arithmetic operation of a state of charge (SOC) based on an integrated value of charge and discharge currents of the battery.

The vibration sensor 258 senses vibration at any portion of the vehicle 20 where it is possible to sense a symptom of a failure of the vehicle 20 such as, for example, vibration of the vehicle 20, vibration of the engine, vibration of the transmission, or vibration of a suspension. The AE sensor 259 is an acoustic emission sensor. The AE sensor 259 is a sensor configure to detect ultrasonic wave and acoustic wave energy that is generated along with a phenomenon such as a deformation of an object, a progress of a crack, or peeling. The AE sensor 259 may be provided at any portion of the vehicle 20 where it is possible to sense a symptom of a failure of the vehicle 20 such as the engine. The oil temperature sensor 260 detects, for example, a temperature of the engine oil (oil temperature). The water temperature sensor 261 detects, for example, a temperature of cooling water flowing in a water jacket that is a cooling water channel formed in a cylinder head and a cylinder. The acceleration sensor 264 detects an acceleration of the vehicle 20 to determine whether the vehicle 20 is in an acceleration state, a deceleration state, or a constant speed state (cruise state).

According to the present embodiment, the HVECU 210 of the vehicle 20 generates data indicating the state of the vehicle 20 based on the detection results from the various types of the sensors 250, and provides the data to the failure symptom determination apparatus 100.

The HVECU 210 includes an acquisition unit 211, a generation unit 212, an output unit 213, and a storage unit 215. The acquisition unit 211 acquires a plurality of pieces of data from a plurality of sensor 250 configured to sense a state of the vehicle 20. The acquisition unit 211 may acquire a plurality of pieces of time series data from the plurality of sensor 250 configured to sense the state of the vehicle 20. The acquisition unit 211 may acquire a plurality of pieces of data from the plurality of sensors 250 configured to sense the state of the vehicle 20 for every predetermined period of time during a state in which the vehicle 20 can travel. For example, as illustrated in FIG. 3, the acquisition unit 211 acquires, as the plurality of pieces of data, an engine rotation speed (R) from the engine rotation speed sensor 256, a vehicle speed (V) of the vehicle 20 from the vehicle speed sensor 251, and a cooling water temperature (T) indicating a temperature of cooling water of the engine from the water temperature sensor 261 at an interval of 0.2 seconds, and stores the data in the storage unit 215.

The acquisition unit 211 may continuously acquire the data indicating the state of the vehicle 20 from the various types of sensors 250 while a driving function of the vehicle 20 is operating. The acquisition unit 211 may acquire the data indicating the state of the vehicle 20 continuously acquired from the various types of sensors 250 during a period from a time when an ignition switch is turned on until a time when the ignition switch is turned off. The acquisition unit 211 may acquire the data indicating the state of the vehicle 20 from the various types of sensors 250 at a predetermined timing at which a symptom of occurrence of a failure is easily sensed while the driving function of the vehicle 20 is operating. The acquisition unit 211 may acquire the data indicating the state of the vehicle 20 from the various types of sensors 250 while the travelling state of the vehicle 20 continues in the acceleration state, the deceleration state, or the fixed speed state for a predetermined period of time (5 seconds) or longer and also the driving function of the vehicle 20 is operating.

The generation unit 212 generates feature amount data indicating a feature amount of each of the plurality of pieces of data according to a predetermined algorithm from the plurality of pieces of data acquired by the acquisition unit 211, and stores the feature amount data in the storage unit 215. The generation unit 212 may generate a numeric vector that is the feature amount data indicating the feature amount of each of the plurality of pieces of data. The generation unit 212 may generate the numeric vector of each of the plurality of pieces of data by calculating average values, maximum values, minimum values, and average values of the inclinations of the data at every predetermined time slot (for example, every 3 seconds). As illustrated in FIG. 4, the generation unit 212 may calculate, with regard to the engine rotation speed (R) at every 3 seconds, an average value ($R_{av}$), a maximum value ($R_{mx}$), a minimum value ($R_{mn}$), and an average value of the inclinations ($R_{in}$). The generation unit 212 may calculate, with regard to the vehicle speed (V) at every 3 seconds, an average value ($V_{av}$), a maximum value ($V_{mx}$), a minimum value ($V_{mn}$), and an average value of the inclinations ($V_{in}$). The generation unit 212 may calculate, with regard to the cooling water temperature (T) at every 3 seconds, an average value ($T_{av}$), a maximum value ($T_{mx}$), a minimum value ($T_{mn}$), and an average value of the inclinations ($T_{in}$). The generation unit 212 may calculate, as the feature amount of the data, at least one of a standard deviation, an amplitude value, a frequency, a minimum inclination, a maximum inclination, a skewness, and a kurtosis used in statistics as the feature amount of the data.

Herein, the inclination is a feature amount corresponding to a determination index indicating an extent to which the vehicle 20 is being accelerated or decelerated or indicating being in a cruise drive (constant speed drive). The inclination is a value obtained by differentiating a variation of a parameter value f(x) relative to an elapse of time (h), and is calculated by the following expression (1). In a digital arithmetic operation, the inclination is calculated by an arithmetic operation of a difference of the parameter value f(x).

$$\lim \frac{f(x+h) - f(x)}{h} \qquad (1)$$

The output unit 213 outputs the feature amount data of the vehicle 20 and identification information of the vehicle 20 to the failure symptom determination apparatus 100 via the TCU 274 as the data indicating the state of the vehicle 20.

Figure 5:
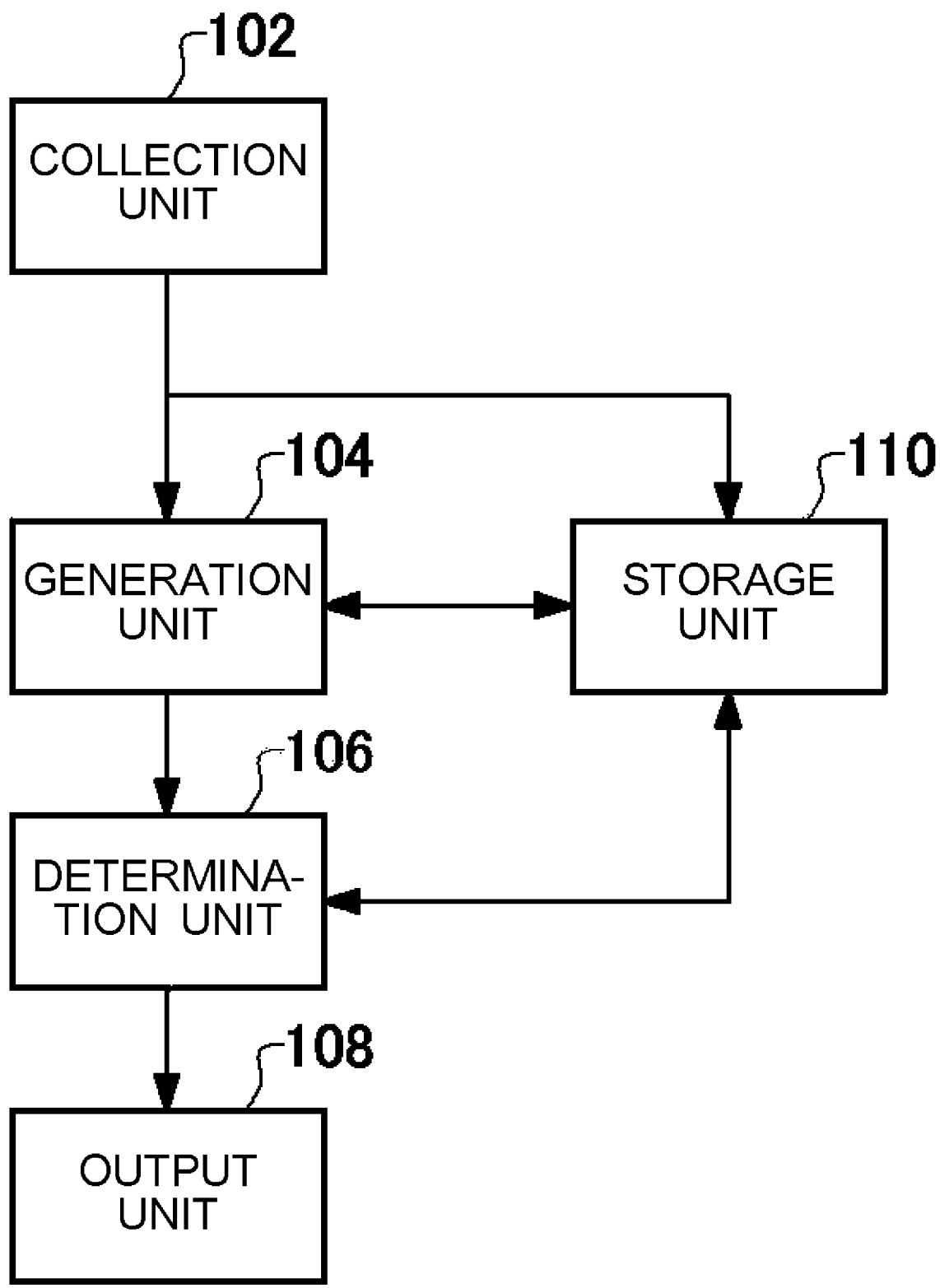
FIG. 5 illustrates one example of a functional block of a failure symptom determination apparatus.

FIG. 5 illustrates one example of a functional block of the failure symptom determination apparatus 100. The failure symptom determination apparatus 100 includes a collection unit 102, a generation unit 104, a determination unit 106, an output unit 108, and a storage unit 110.

The collection unit 102 collects the data indicating the state of the vehicle 20 based on the detection results of the various types of sensors 250 configured to detect the state of the vehicle from a plurality of vehicles 20, and stores the data in the storage unit 110 in association with the identification information of the vehicles 20. The collection unit 102 may collect, from each of the plurality of the vehicles 20, the data indicating the state of the vehicle 20 continuously acquired from the various types of sensors 250 while a drive mechanism of the vehicle 20 is operating. The collection unit 102 may collect, from each of the plurality of the vehicles 20, the data indicating the state of the vehicle 20 continuously acquired from the various types of sensors 250 during a period from a time when an ignition switch is turned on until a time when the ignition switch is turned off. The collection unit 102 may collect, from each of the plurality of the vehicles 20, the data indicating the state of the vehicle 20 acquired from the various types of sensors 250 at a predetermined timing at which a symptom of occurrence of a failure is easily sensed while the drive mechanism of the vehicle 20 is operating. The collection unit 102 may collect, from each of the plurality of the vehicles 20, the data indicating the state of the vehicle 20 acquired from the various types of sensors 250 while the travelling state of the vehicle 20 continues in the acceleration state, the deceleration state, or the fixed speed state for a predetermined period of time (5 seconds) or longer and also the drive mechanism of the vehicle 20 is operating.

The data indicating the state of the vehicle 20 may be data indicating the detection results of the various types of sensors 250. The data indicating the state of the vehicle 20 may be time series data indicating the detection results of the various types of sensors 250 in time series. The data indicating the state of the vehicle 20 may be a numeric vector indicating the feature amount of each of the plurality of pieces of data. The data indicating the state of the vehicle 20 may be data indicating at least one of the torque or the number of rotations of the engine or the motor generator, the temperature of the engine oil, the hydraulic pressure of the engine oil, the temperature of the hydraulic oil of the automatic transmission, the accelerator opening, and the vibration of the vehicle. The collection unit 102 may further collect data related to an environment where the vehicle 20 is present from the plurality of the vehicles 20, and store the data in the storage unit 110 in association with the data indicating the state of the vehicle 20. The data related to the environment where the vehicle 20 is present may be data indicating at least one of an outside air temperature in a surrounding of the vehicle 20 and an area (such as a latitude, a longitude, and an altitude) where the vehicle 20 is present.

Figure 6:
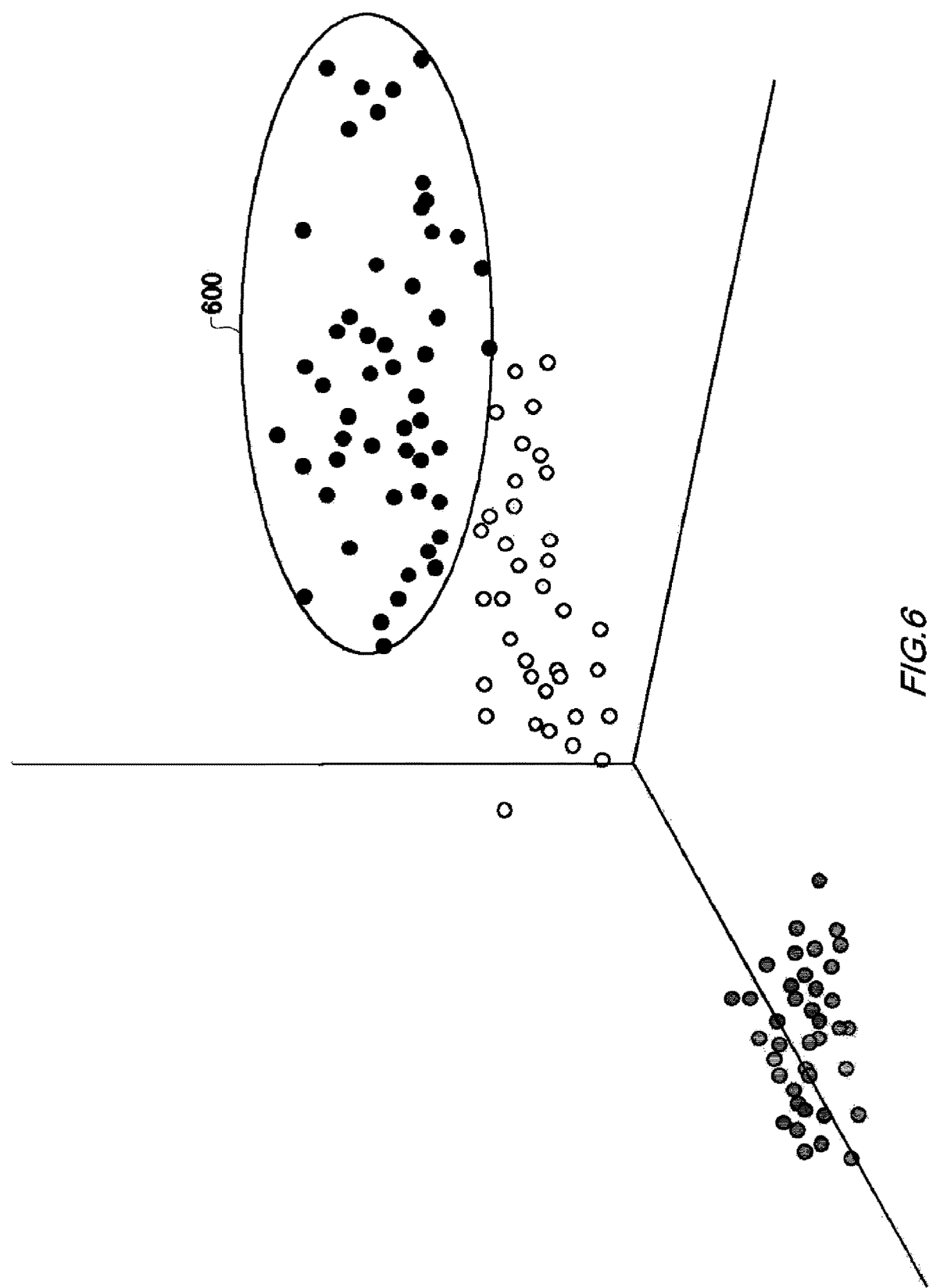
FIG. 6 is a diagram for describing clustering of data.

The generation unit 104 may generate a learning model for identifying the part having the symptom of the failure from among the plurality of parts based on data indicating the state of the vehicle 20 by machine learning using the data indicating the state of the vehicle detected by various types of sensors 250 as training data by a time when a failure of any part occurs among the plurality of parts. The generation unit 104 may generate a learning model with which the respective vehicles 20 can be classified into a plurality of different clusters for each faulty spot and a cluster without a symptom of a failure. The generation unit 104 can use, for example, a support vector machine (SVM) as a supervised machine learning algorithm. When the SVM is used, the generation unit 104 may generate a learning model by learning a hyperplane where a set of points labeled as normal vehicles and respective sets of points differently labeled for each type of faulty parts are separated from each other at a maximum margin. The generation unit 104 may plot the data to a three-dimensional space as illustrated in FIG. 6, and generate a learning model for classifying the plurality of vehicles 20 into a plurality of clusters. The generation unit 104 may generate a learning model for classifying the vehicles 20 corresponding to the data included in the area 600 of FIG. 6, for example, into one cluster as a vehicle including a specific part having a symptom of the failure.

The determination unit 106 determines the part having the symptom of the failure from among the plurality of parts based on the data indicating the state of the vehicle 20 according to the learning model. The determination unit 106 determines the part having the symptom of the failure from among parts such as a gear, a bearing, a rotor, and a winding wire configuring the drive mechanism according to the learning model.

The output unit 108 outputs part information indicating the part having the symptom of the failure towards the part management apparatus 300 and the terminal 32 of the dealer 30. The output unit 108 may output the part information indicating the part having the symptom of the failure towards the relevant vehicle 20. The part information may include identification information of the vehicle 20, and identification information of the part having the symptom of the failure.

Figure 7:
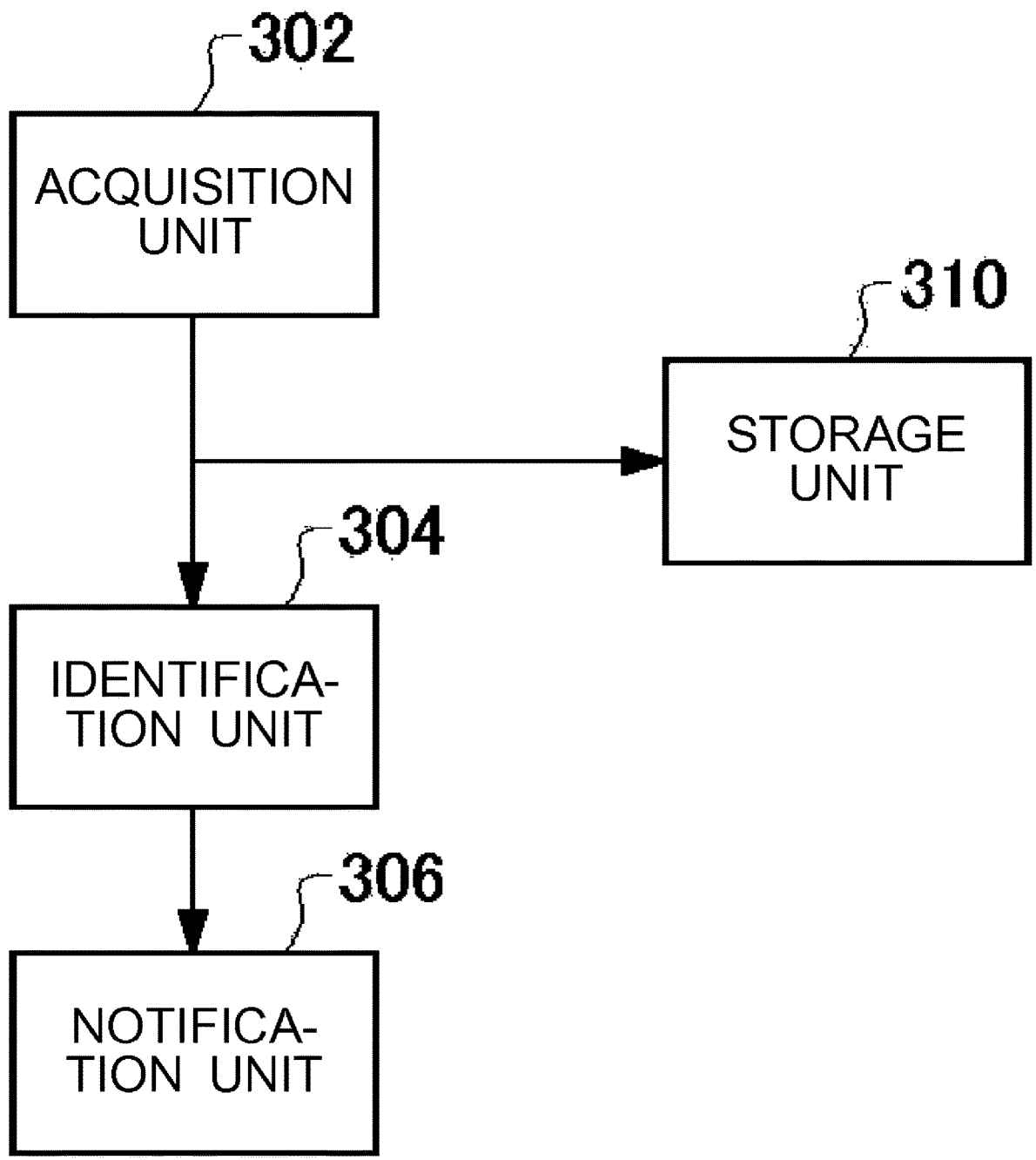
FIG. 7 illustrates one example of a functional block of a part management apparatus.

FIG. 7 illustrates a functional block of the part management apparatus 300. The part management apparatus 300 includes an acquisition unit 302, an identification unit 304, a notification unit 306, and a storage unit 310. The acquisition unit 302 acquires the part information indicating the part having the symptom of the failure among the plurality of parts configuring the drive mechanism mounted to the vehicle 20. The acquisition unit 302 may acquire, from the failure symptom determination apparatus 100, the part information indicating the part having the symptom of the failure which is determined by the failure symptom determination apparatus 100 based on data indicating the state of the vehicle 20 by using a predetermine learning model.

The storage unit 310 stores information related to a material of each of the parts configuring the drive mechanism. The storage unit 310 may store, for each part, a material configuring the part, and a weight (kg) of the material required to fabricate the part as illustrated in FIG. 8, for example.

The identification unit 304 refers to the storage unit 310 and identifies the material of the part indicated by the part information. The identification unit 304 may further identify the weight of the material required to fabricate the part. The notification unit 306 notifies the material management apparatus 400 configured to manage an inventory of a material of a part, of information related to the material of the part.

The acquisition unit 302 may further acquire recovery schedule information indicating a schedule to recover the part having the symptom of the failure. The acquisition unit 302 may acquire the recovery schedule information indicating the schedule to recover the part having the symptom of the failure via the terminal 32 of the dealer 30. The acquisition unit 302 may acquire the recovery schedule information indicating a scheduled day for replacement of the part having the symptom of the failure via the terminal 32 of the dealer 30. The notification unit 306 may notify the material management apparatus 400 of the recovery schedule information. The recovery schedule information may indicate identification information for identifying a failure symptom vehicle to which the part having the symptom of the failure is mounted and information related to a material and a weight of the part having the symptom of the failure.

The material management apparatus 400 includes a database 410 configured to store information related to the material required to fabricate the part. The material management apparatus 400 manages a weight of the material of the part to be recovered and a weight of the material required to fabricate a new part used for repair based on the information related to the material of the part and the recovery schedule information indicating the schedule to recover the part. For example, as illustrated in FIG. 9, the database 410 may store the identification information of each of the parts, the identification information of the material required to fabricate each of the parts, the number of each of the parts the orders of which are currently received, the number of parts that can be recovered by a fabrication start time of the part and utilized for the fabrication as the material of the part, and a total weight (kg) of the material to be newly ordered to fabricate the new part.

With this configuration, by taking into account the weight of the recyclable material after the part is recovered, only the required weight of the material to fabricate the part can be ordered. Thus, the wasteful fabrication of the material can be avoided.

Figure 10:
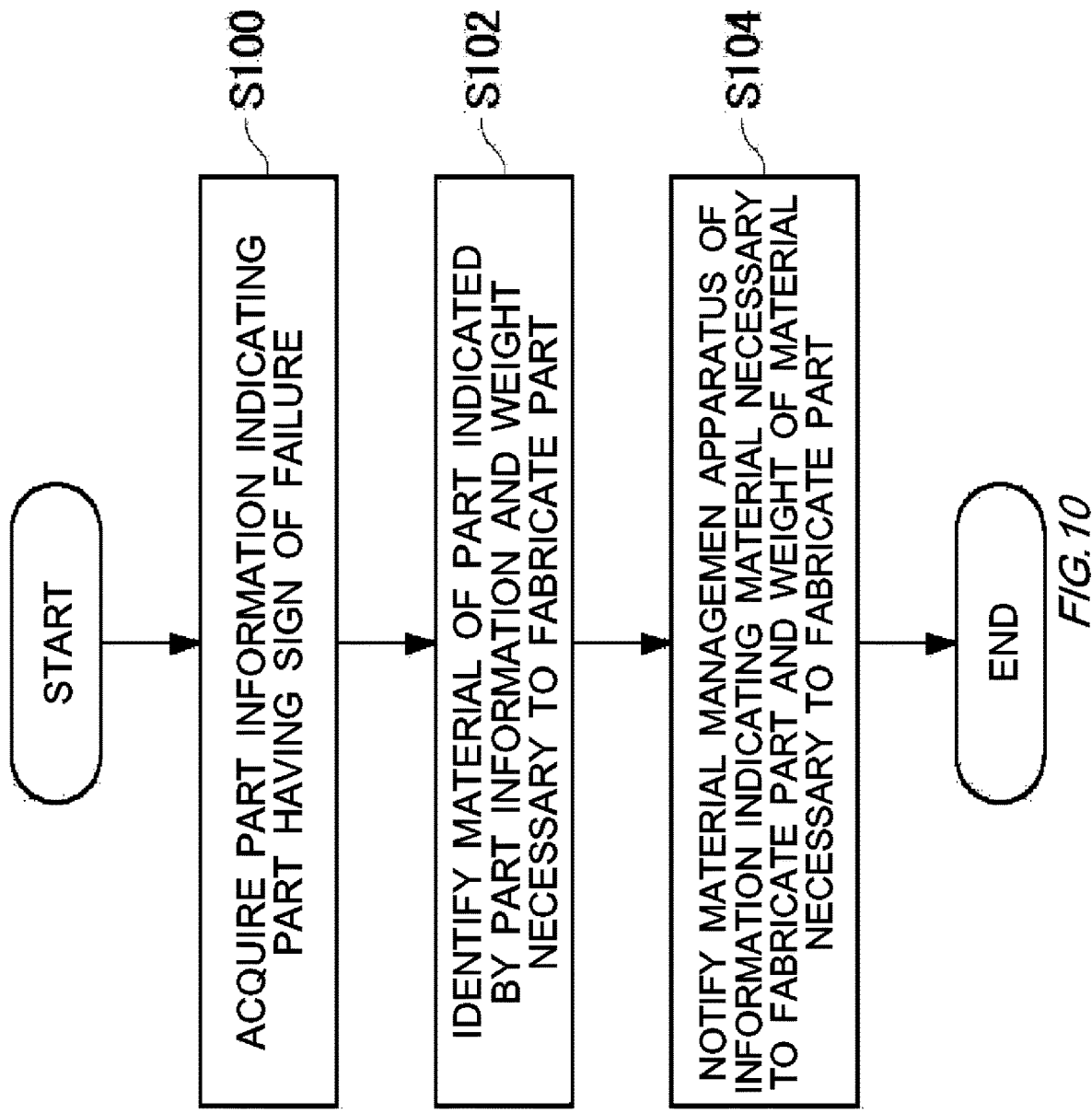
FIG. 10 is a flowchart illustrating one example of a processing procedure when the part management apparatus acquires part information indicating a part having a symptom of a failure.

FIG. 10 is a flowchart illustrating one example of a processing procedure when the part management apparatus 300 acquires the part information indicating the part having the symptom of the failure.

The acquisition unit 302 acquires the part information indicating the part having the symptom of the failure from the failure symptom determination apparatus 100 (S100). The identification unit 304 refers to the storage unit 310 to identify the material of the part indicated by the part information and the weight of the material required to fabricate the part (S102). The notification unit 306 notifies the material management apparatus 400 of information indicating the material required to fabricate the part and the weight of the material required to fabricate the part (S104).

As described above, according to the present embodiment, when the part having the symptom of the failure is present, it is possible to place an order of the material in advance while the order placement of the part is expected. In addition, by taking into account the schedule to recover the faulty part, it is possible to decide the total weight of the material required to fabricate the part. Thus, it is possible to contribute to sustainable development goals (SDGs) without the wasteful fabrication of the material.

Figure 11:
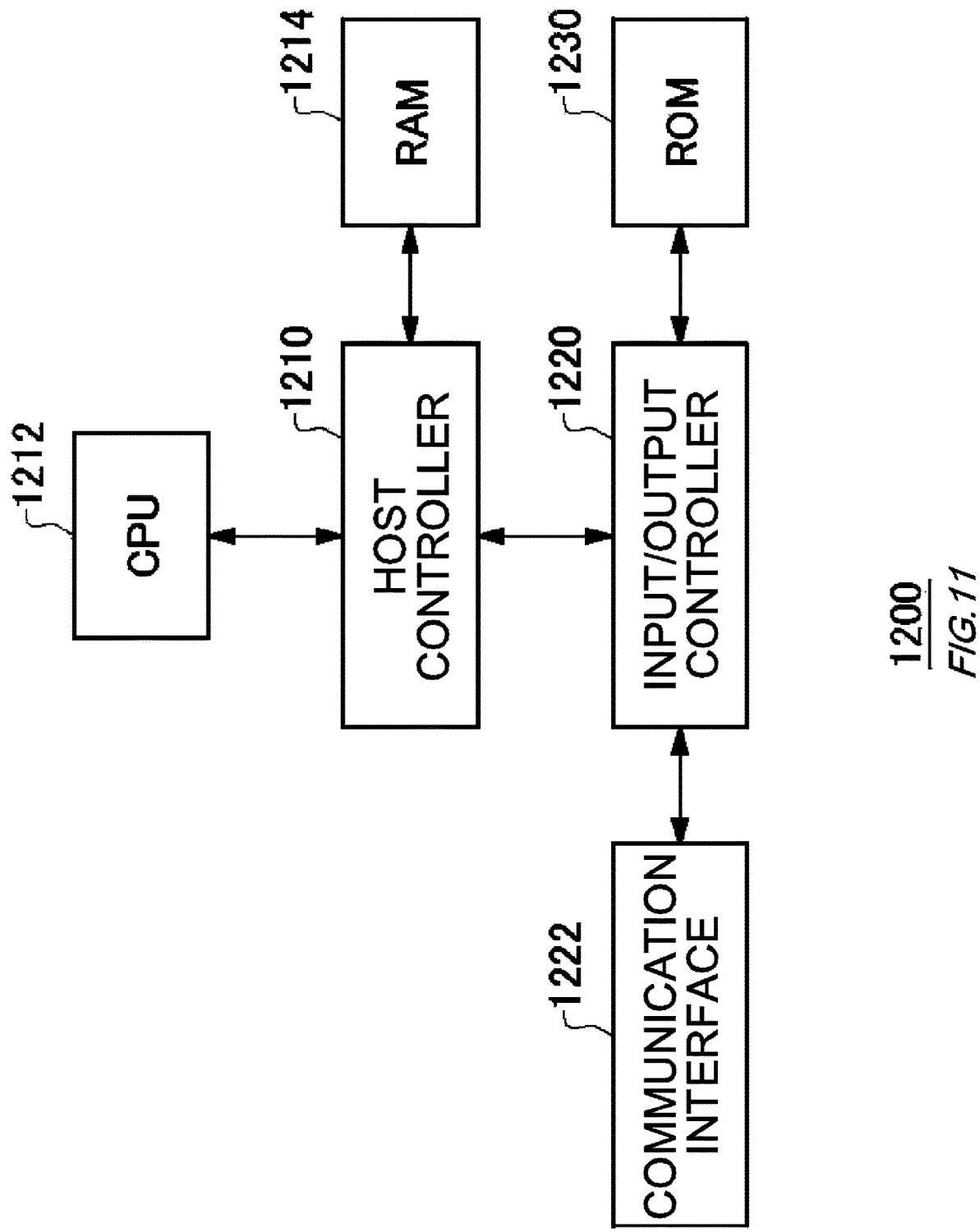
FIG. 11 illustrates one example of a hardware configuration.

FIG. 11 illustrates one example of a computer 1200 where a plurality of embodiments of the present invention may be entirely or partially embodied. Programs installed in the computer 1200 can cause the computer 1200 to function as operations associated with the apparatus according to the embodiments of the present invention or one or more "units" of the apparatuses. Alternatively, the programs can cause the computer 1200 to execute the operations or the one or more "units". The programs can cause the computer 1200 to execute a process according to the embodiments of the present invention or steps of the process. Such programs may be executed by a central processing unit (CPU) 1212 in order to cause the computer 1200 to execute a specific operation associated with some or all of the blocks in the flowcharts and the block diagram described in the present specification.

The computer 1200 according to the present embodiment includes the CPU 1212 and a RAM 1214, which are mutually connected by a host controller 1210. The computer 1200 also includes a communication interface 1222 and an input/output unit, which are connected to the host controller 1210 via an input/output controller 1220. The computer 1200 also includes a ROM 1230. The CPU 1212 operates according to the programs stored in the ROM 1230 and the RAM 1214, thereby controlling each unit.

The communication interface 1222 communicates with other electronic devices via a network. A hard disk drive may store the programs and data used by the CPU 1212 in the computer 1200. The ROM 1230 stores therein boot programs or the like executed by the computer 1200 at the time of activation, and/or stores programs depending on hardware of the computer 1200. The programs are provided via a computer readable recording medium such as a CD-ROM, a USB memory, or an IC card, or a network. The programs are installed in the RAM 1214 or the ROM 1230 which is also an example of the computer readable recording medium, and executed by the CPU 1212. Information processing written in these programs is read by the computer 1200, and provides cooperation between the programs and the various types of hardware resources described above. An apparatus or a method may be configured by implementing operations or processing of information according to a use of the computer 1200.

For example, when communication is performed between the computer 1200 and an external device, the CPU 1212 may execute a communication program loaded in the RAM 1214, and instruct the communication interface 1222 to execute communication processing based on processing written in the communication program. The communication interface 1222, under the control of the CPU 1212, reads transmission data stored in a transmission buffer region provided in a recording medium such as the RAM 1214 or the USB memory, transmits the read transmission data to the network, or writes reception data received from the network to a reception buffer region or the like provided on the recording medium.

In addition, the CPU 1212 may cause all or necessary portion of a file or a database stored in an external recording medium such as a USB memory, to be read by the RAM 1214, and execute various types of processing on the data on the RAM 1214. Next, the CPU 1212 may write back the processed data to the external recording medium.

Various types of programs and various types of information such as data, a table, and a database may be stored in the recording medium, and subjected to information processing. The CPU 1212 may execute, on the data read from the RAM 1214, various types of processing including various types of operations, information processing, conditional judgement, conditional branching, unconditional branching, information retrieval/replacement, or the like described in any part in the present disclosure and specified by instruction sequences of the programs, and writes back the results to the RAM 1214. In addition, the CPU 1212 may retrieve information in a file, a database, or the like in the recording medium. For example, when a plurality of entries each having an attribute value of a first attribute associated with an attribute value of a second attribute are stored in the recording medium, the CPU 1212 may retrieve, out of the plurality of entries, an entry with the attribute value of the first attribute specified that meets a condition, read the attribute value of the second attribute stored in the entry, and thereby acquire the attribute value of the second attribute associated with the first attribute meeting a predetermined condition.

The programs or software module described above may be stored on the computer 1200 or in a computer readable storage medium near the computer 1200. In addition, a recording medium such as a hard disk or a RAM provided in a server system connected to a dedicated communication network or the Internet can be used as the computer readable storage medium, so that the programs are provided to the computer 1200 via the network.

Computer readable media may include any tangible device that can store instructions for execution by a suitable device. As a result, the computer readable medium having instructions stored therein includes an article of manufacture including instructions which can be executed to create means for performing operations specified in the flowcharts or block diagrams. Examples of computer readable media may include an electronic storage medium, a magnetic storage medium, an optical storage medium, an electromagnetic storage medium, a semiconductor storage medium, etc. More specific examples of computer readable media may include a floppy (registered trademark) disk, a diskette, a hard disk, a random access memory (RAM), a read only memory (ROM), an erasable programmable read only memory (EPROM or Flash memory), an electrically erasable programmable read only memory (EEPROM), a static random access memory (SRAM), a compact disc read only memory (CD-ROM), a digital versatile disk (DVD), a BLU-RAY (registered trademark) disc, a memory stick, an integrated circuit card, etc.

Computer readable instructions may include either a source code or an object code written in any combination of one or more programming languages. The source code or the object code includes a conventional procedural programming language. The conventional procedural programming language may be assembler instructions, instruction-set-architecture (ISA) instructions, machine instructions, machine dependent instructions, microcode, firmware instructions, state-setting data, or an object oriented programming language such as Smalltalk (registered trademark), JAVA (registered trademark), C++, etc., and programming languages, such as the "C" programming language or similar programming languages. Computer readable instructions may be provided to a processor of a general purpose computer, special purpose computer, or other programmable data processing device, or to programmable circuitry, locally or via a local area network (LAN), a wide area network (WAN) such as the Internet, etc. The processor or the programmable circuitry may execute the computer readable instructions in order to create means for performing operations specified in the flowcharts or block diagrams. Examples of processors include computer processors, processing units, microprocessors, digital signal processors, controllers, microcontrollers, etc.

While the present invention have been described above by way of the embodiments, the technical scope of the present invention is not limited to the above described embodiments. It is apparent to persons skilled in the art that various alterations and improvements can be added to the above described embodiments. It is also apparent from the description of the scope of the claims that the embodiments added with such alterations or improvements can be included in the technical scope of the present invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

10: part management system
20: vehicle
30: dealer
32: 510 terminal
50: network
100: failure symptom determination apparatus
102: collection unit
104: generation unit
106: determination unit
108: output unit
110: storage unit
200: control system
210: HVECU
211: acquisition unit
212: generation unit
213: output unit
215: storage unit
230: ECU
231: MGECU
232: engine ECU
233: transmission ECU
234: battery ECU
250: sensor
251: vehicle speed sensor
252: accelerator opening sensor
253: inclination angle sensor
254: MG rotation speed sensor
255: shift position sensor
256: engine rotation speed sensor
257: throttle opening sensor
258: vibration sensor
259: AE sensor
260: oil temperature sensor
261: water temperature sensor
262: battery temperature sensor
263: battery current sensor
264: acceleration sensor
273: GNSS receiver
300: part management apparatus
302: acquisition unit
304: identification unit
306: notification unit
310: storage unit
400: material management apparatus
410: database
500: factory
1200: computer
1210: host controller
1212: CPU
1214: RAM
1220: input/output controller
1222: communication interface
1230: ROM

What is claimed is:

1. A part management apparatus comprising:
an acquisition unit configured to acquire part information indicating a part having a symptom of a failure among a plurality of parts configuring a drive mechanism mounted to a vehicle;
an identification unit configured to refer to a storage unit configured to store a material configuring each of the plurality of parts to identify a material of the part indicated by the part information; and
a notification unit configured to notify a material management apparatus configured to manage an inventory of a material of a part, of information related to the material of the part, wherein
the storage unit is configured to further store a weight of a material required to fabricate each of the plurality of parts,
the identification unit is configured to further identify a weight of the material required to fabricate the part indicated by the part information, and
the notification unit is configured to notify the material management apparatus of information related to the material of the part including the weight of the material required to fabricate the part.

2. The part management apparatus according to claim 1, wherein
the acquisition unit is configured to further acquire recovery schedule information indicating a schedule to recover the part having the symptom of the failure, and
the notification unit is configured to notify the material management apparatus of the recovery schedule information.

3. The part management apparatus according to claim 2, wherein
the plurality of parts include at least one of a gear, a bearing, a rotor, and a winding wire configuring the drive mechanism.

4. The part management apparatus according to claim 1, wherein
the acquisition unit is configured to further acquire recovery schedule information indicating a schedule to recover the part having the symptom of the failure, and the notification unit is configured to notify the material management apparatus of the recovery schedule information.

5. The part management apparatus according to claim 1, wherein
the plurality of parts include at least one of a gear, a bearing, a rotor, and a winding wire configuring the drive mechanism.

6. A part management apparatus comprising:
an acquisition unit configured to acquire part information indicating a part having a symptom of a failure among a plurality of parts configuring a drive mechanism mounted to a vehicle;
an identification unit configured to refer to a storage unit configured to store a material configuring each of the plurality of parts to identify a material of the part indicated by the part information; and
a notification unit configured to notify a material management apparatus configured to manage an inventory of a material of a part, of information related to the material of the part, wherein
the plurality of parts include at least one of a gear, a bearing, a rotor, and a winding wire configuring the drive mechanism.

7. A part management system comprising:
a part management apparatus including:
an acquisition unit configured to acquire part information indicating a part having a symptom of a failure among a plurality of parts configuring a drive mechanism mounted to a vehicle;
an identification unit configured to refer to a storage unit configured to store a material configuring each of the plurality of parts to identify a material of the part indicated by the part information; and
a notification unit configured to notify a material management apparatus configured to manage an inventory of a material of a part, of information related to the material of the part, and
a failure symptom determination apparatus configured to determine a part having a symptom of a failure among the plurality of parts, the failure symptom determination apparatus including:
a collection unit configured to collect data indicating a state of a vehicle detected by a sensor mounted to a vehicle from a plurality of vehicles;
a generation unit configured to generate a learning model for identifying, by machine learning using the data indicating the state of the vehicle detected by the sensor mounted to the vehicle as training data, a part having a symptom of a failure from among the plurality of parts based on data indicating the state of the vehicle by a time when a failure of any of parts among the plurality of parts occurs;
a determination unit configured to determine a part having a symptom of a failure from among the plurality of parts based on the data indicating the state of the vehicle according to the learning model; and
an output unit configured to output part information indicating the determined part having the symptom of the failure to the part management apparatus.

8. The part management system according to claim 7, wherein
the storage unit is configured to further store a weight of a material required to fabricate each of the plurality of parts, the identification unit is configured to further identify a weight of the material required to fabricate the part indicated by the part information, and
the notification unit is configured to notify the material management apparatus of information related to the material of the part including the weight of the material required to fabricate the part.

9. The part management system according to claim 8, wherein
the acquisition unit is configured to further acquire recovery schedule information indicating a schedule to recover the part having the symptom of the failure, and
the notification unit is configured to notify the material management apparatus of the recovery schedule information.

10. The part management system according to claim 7, wherein
the acquisition unit is configured to further acquire recovery schedule information indicating a schedule to recover the part having the symptom of the failure, and
the notification unit is configured to notify the material management apparatus of the recovery schedule information.

11. The part management system according to claim 7, wherein
the data indicating the state of the vehicle indicates at least one of a torque or a number of rotations of an engine or a motor generator, a temperature of engine oil, a hydraulic pressure of the engine oil, a temperature of hydraulic oil of an automatic transmission, an accelerator opening, a vibration of the vehicle, and a speed of the vehicle.

12. The part management system according to claim 11, further comprising:
the material management apparatus, wherein
the material management apparatus is configured to manage a weight of the material of the part to be recovered and a weight of a material required to fabricate a new part used for repair based on the information related to the material of the part and recovery schedule information indicating a schedule to recover the part.

13. A part management method comprising:
acquiring part information indicating a part having a symptom of a failure among a plurality of parts configuring a drive mechanism mounted to a vehicle;
referring to a storage unit configured to store a material configuring each of the plurality of parts and a weight of a material required to fabricate each of the plurality of parts to identify a material of the part indicated by the part information;
notifying a material management apparatus configured to manage an inventory of a material of a part, of information related to the material of the part;
identifying a weight of the material required to fabricate the part indicated by the part information; and
notifying the material management apparatus of information related to the material of the part including the weight of the material required to fabricate the part.

14. A computer readable recording medium having recorded thereon a program for causing a computer to execute:
acquiring part information indicating a part having a symptom of a failure among a plurality of parts configuring a drive mechanism mounted to a vehicle;
referring to a storage unit configured to store a material configuring each of the plurality of parts and a weight of a material required to fabricate each of the plurality of parts to identify a material of the part indicated by the part information;

notifying a material management apparatus configured to manage an inventory of a material of a part, of information related to the material of the part;

identifying a weight of the material required to fabricate the part indicated by the part information; and notifying the material management apparatus of information related to the material of the part including the weight of the material required to fabricate the part.

* * * * *